US010732935B2

(12) United States Patent
Ganninger et al.

(10) Patent No.: US 10,732,935 B2
(45) Date of Patent: Aug. 4, 2020

(54) DISPLAYING STATUS DATA IN A SOURCE CODE DEVELOPMENT SYSTEM

(71) Applicant: ATLASSIAN PTY LTD, Sydney (AU)

(72) Inventors: Brian Eric Ganninger, Sunnyvale, CA (US); Joel Unger, Eugene, OR (US); Rahul Chhabria, San Francisco, CA (US)

(73) Assignee: Atlassian Pty Ltd, Syndey (AU)

( * ) Notice: Subject to any disclaimer, the term of this patent is extended or adjusted under 35 U.S.C. 154(b) by 179 days.

(21) Appl. No.: 15/634,390

(22) Filed: Jun. 27, 2017

(65) Prior Publication Data

US 2018/0373502 A1 Dec. 27, 2018

(51) Int. Cl.
*G06F 9/44* (2018.01)
*G06F 11/36* (2006.01)
*G06F 17/50* (2006.01)
*G06F 3/0482* (2013.01)
*G06F 8/71* (2018.01)
*G06F 8/34* (2018.01)
*G06F 8/36* (2018.01)

(52) U.S. Cl.
CPC .......... *G06F 8/34* (2013.01); *G06F 8/36* (2013.01); *G06F 8/71* (2013.01)

(58) Field of Classification Search
CPC ..... G06F 8/36; G06F 8/71; G06F 8/34; G06F 8/33; G06F 3/04817; G06F 3/0482; G06F 3/04842; G06F 11/3664; G06F 11/3636; G06F 11/362; G06F 3/0488; G06F 8/20; G06F 8/60; G06F 8/10; G06F 8/65; G06F 8/70; G06F 40/106; G06F 11/3616; G06F 11/3672; G06F 11/3676; G06Q 10/06; G06Q 20/12; G06Q 20/00; G06Q 20/10; G06Q 20/102; H04L 67/10; H04L 67/22; H04L 67/02

See application file for complete search history.

(56) References Cited

U.S. PATENT DOCUMENTS

| 7,562,344 | B1 * | 7/2009 | Allen ........................ G06F 8/33 |
| | | | 717/100 |
| 9,077,849 | B2 * | 7/2015 | Meek ...................... G06Q 10/06 |
| 9,176,731 | B1 * | 11/2015 | Ziftci ......................... G06F 8/73 |
| 9,317,257 | B2 * | 4/2016 | Bragdon ................... G06F 8/33 |
| 9,323,418 | B2 * | 4/2016 | DiVita ................... G06F 3/0481 |
| 9,489,283 | B1 * | 11/2016 | Popovici ............. G06F 11/3636 |

(Continued)

OTHER PUBLICATIONS

Baltes et al., Linking sketches and diagrams to source code artifacts, 4 pages (Year: 2014).*

(Continued)

*Primary Examiner* — Thuy Dao
(74) *Attorney, Agent, or Firm* — Hickman Palermo Becker Bingham LLP; Christine E. Orich

(57) ABSTRACT

The disclosed technologies can directly integrate status data relating to a source code repository into a client application, such as a graphical software development interface. For example, the disclosed technologies enable a client application executing on a computer used by a software developer to generate and display, on the developer's computer, a visual representation of status data that relates to a cloud-based source code repository, when the status data relates to an action executed by the client application that involves the source code repository.

21 Claims, 5 Drawing Sheets

(56) References Cited

U.S. PATENT DOCUMENTS

| | | | | |
|---|---|---|---|---|
| 9,971,572 | B2* | 5/2018 | Childs | G06F 8/33 |
| 9,983,860 | B1* | 5/2018 | Koty | H04L 67/10 |
| 10,025,565 | B2* | 7/2018 | Garipov | G06F 8/34 |
| 10,061,578 | B2* | 8/2018 | Walsh | G06F 16/282 |
| 10,139,995 | B2* | 11/2018 | Allen | G06F 8/34 |
| 10,382,547 | B2* | 8/2019 | Berger | G06Q 10/101 |
| 10,409,583 | B2* | 9/2019 | Sreenivasa | G06F 9/547 |
| 10,521,284 | B2* | 12/2019 | McClory | G06F 9/5027 |
| 10,545,855 | B1* | 1/2020 | Jayaswal | G06F 11/3664 |
| 10,599,423 | B2* | 3/2020 | Coleman | G06F 8/71 |
| 2003/0226131 | A1* | 12/2003 | Li | G06F 8/33 717/110 |
| 2009/0276752 | A1* | 11/2009 | Sharma | G06F 8/20 717/103 |
| 2013/0152047 | A1* | 6/2013 | Moorthi | G06F 11/368 717/124 |
| 2014/0173561 | A1* | 6/2014 | Toub | G06F 8/73 717/123 |
| 2014/0337715 | A1* | 11/2014 | Madden | G06F 8/75 715/236 |
| 2015/0106790 | A1* | 4/2015 | Bigwood | G06F 11/3624 717/127 |
| 2015/0268951 | A1* | 9/2015 | Wang | G06Q 10/06 717/103 |
| 2016/0026439 | A1* | 1/2016 | Zaydman | G06F 8/33 717/113 |
| 2016/0246703 | A1* | 8/2016 | Bank | G06F 11/3664 |
| 2016/0291970 | A1* | 10/2016 | Mallisetty | G06F 8/71 |
| 2018/0225339 | A1* | 8/2018 | Bhave | G06F 11/3476 |

OTHER PUBLICATIONS

Swift et al., Visual code annotations for cyberphysical programming, 4 pages (Year: 2013).*
Kalyan et al., A Collaborative Code Review Platform for GitHub, 6 pages (Year: 2016).*
Vasilescu et al., Quality and productivity outcomes relating to continuous integration in GitHub, 12 pages (Year: 2015).*
Kim et al., Software architecture model driven reverse engineering approach to open source software development, 6 pages (Year: 2014).*

* cited by examiner

DISPLAYING STATUS DATA IN A SOURCE CODE DEVELOPMENT SYSTEM

TECHNICAL FIELD

The present disclosure relates to computer software development. Aspects of the present disclosure are directed to communicating status data to a source code development system, and more particularly to communicating, over a network, digital status data relating to a shared source code repository to a software development interface.

BACKGROUND

The developments described in this section are approaches that could be pursued, but not necessarily approaches that have been previously conceived or pursued. However, unless otherwise indicated, it should not be assumed that any of the developments described in this section qualify as prior art, or that these developments are generally known to a person of ordinary skill in the art.

To create computer software, developers write computer programs that include source code. The computer program files may be stored in a centralized storage system, which may be referred to as a source code repository. Software development is often an iterative process involving cycles of writing, compiling, updating, and testing the source code. A source code management (SCM) system (also called a revision control system or a version control system) can be used to track and manage source code that is stored in a software repository.

A software repository, or simply, repository, is a computerized data structure that can be used to store source code files in an organized and searchable manner. All or portions of a repository can be stored on a single computer or distributed over a network of computers. For example, portions of a repository may be stored on an individual user's machine while other portions are stored on one or more server computers connected over a network such as the Internet.

Software development can be a collaborative process, in which different developers write different portions of the software. In a collaborative effort, software developers may be required to periodically integrate their source code into a shared source code repository. An SCM system can be used to manage contributions to the shared repository.

SUMMARY

The appended claims may serve as a summary of the present invention.

Figure 1:
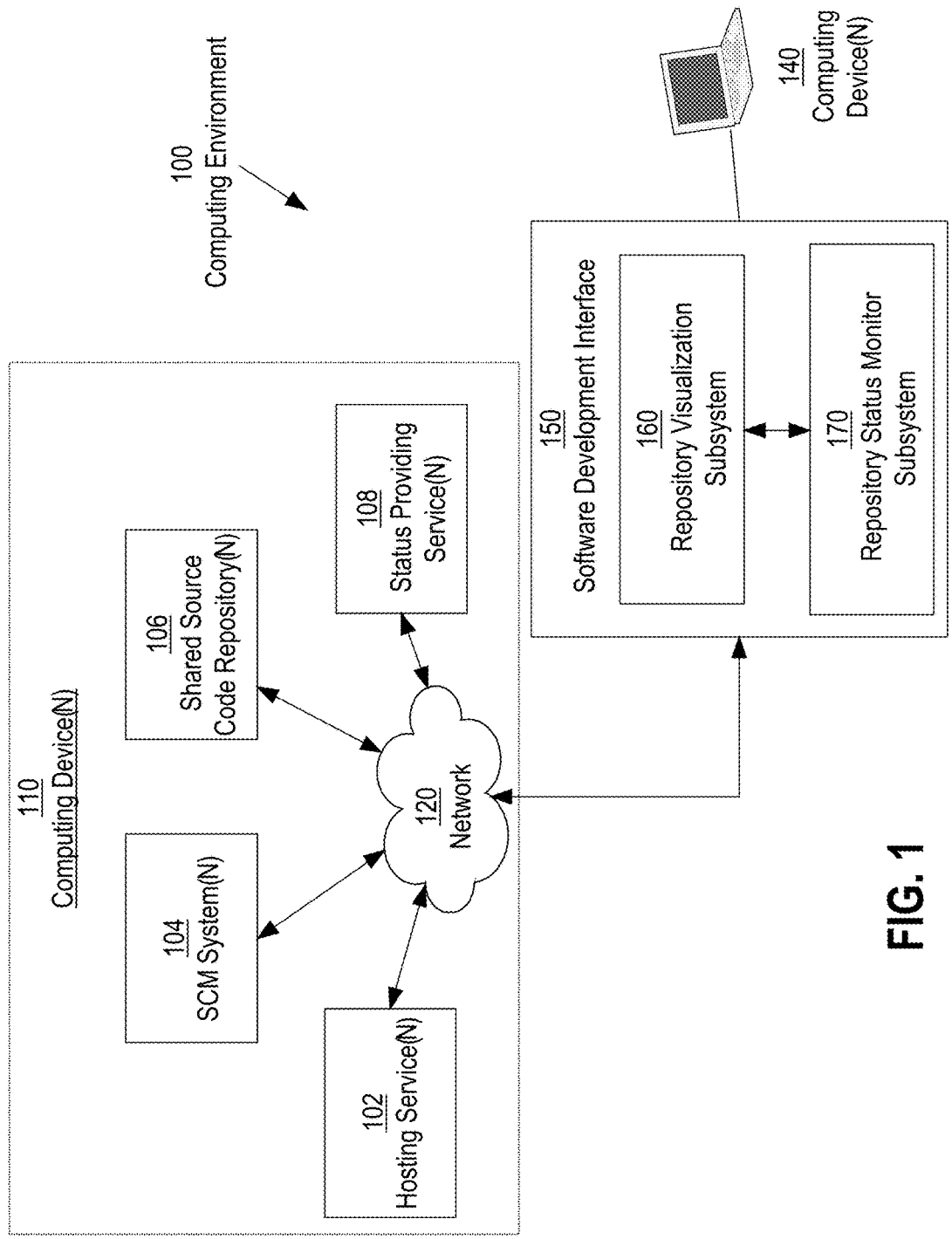
FIG. 1 is a simplified block diagram illustrating at least one embodiment of a computing system in which aspects of the present disclosure may be implemented.

While the present invention is amenable to various modifications and alternative forms, specific embodiments are shown by way of example in the drawings and are described in detail. However, the drawings and description are not intended to limit the invention to the forms disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth to provide a more thorough understanding of the present invention. It will be apparent, however, that the present invention may be practiced without these specific details. In the drawings, the depiction of structures and devices may be simplified to avoid unnecessarily obscuring the present invention.

Overview

In general, a source code repository can be service-neutral; that is, a source code repository can be hosted by any networked or cloud-based source code management (SCM) service. The networked SCM service tracks changes in computer program files over time, coordinates work among multiple software developers, and enforces access/permission controls.

Centralized version control systems use a client-server architecture in which a single, central repository is used to maintain the entire codebase. Client computers execute operations periodically to synchronize with the single, central repository.

Distributed version control systems use a peer-to-peer architecture in which each peer computer maintains its own working copy of the codebase, such that each peer computer's working copy is a complete copy of the repository. The distributed version control system synchronizes repositories by merging and coordinating changes among the peer computers; however, the distributed version control system typically does not have access to repository-related metadata such as build status or server status.

An SCM service implements a set of computerized operations that the SCM service exposes to software developers to manage the developers' contributions to a repository. These operations allow developers to, for example, perform build operations, commit changes to a source code repository, view the change history, and revert previously committed changes. The term build, or build operation, or build service, may be used in this document to refer to a computer operation or set of computer operations, that, when executed by a computer on source code, are designed to either result in the creation of an executable piece of software or identify errors in the source code.

When a build operation is successful, the source code updates involved in the build can be incorporated into a shared repository, for instance by way of a commit operation. The term shared repository may be used in this document to refer to a source code repository into which code is contributed by multiple different software developers. Unless otherwise indicated, the term shared repository is considered architecture-independent. That is, shared repositories can be managed by a centralized SCM or a distributed SCM, or another type of service.

A software tool such as a continuous integration (CI) management system can be used to manage the process of preparing new source code to be incorporated into a shared repository. For example, CI services such as BITBUCKET and others can be used in conjunction with an SCM service to add additional collaborative functionality to the SCM system via application programming interfaces (APIs) and metadata, such as build status, which may be stored separately on the CI system servers.

The CI management system may interface with the SCM service to ensure that source code updates are verified before the source code updates are incorporated into the shared repository. To perform the verification, the CI management system may perform automated tests on the source code, such as source code style checks, static code analysis, build tests, unit tests, integration tests, performance tests, etc. The CI management system can generate and send notifications to developers when their source code has been successfully verified by automated testing operations, or when the automated testing operations detect problems with the source code.

Traditionally, software developers have worked directly with an SCM service using a command line interface, in which the primary input method is the typing of individual commands in alphanumeric text using a keyboard or keypad. More recently, some SCM service providers offer a client application by which a software developer can interface with the SCM service functionality at a more human-intuitive level. For example, in a graphical user interface (GUI) client that interfaces with the source code repository, detailed sets of textual commands and information may be represented by graphical elements such as color-coded lines and icons. One example of a GUI client for a source code repository is SOURCETREE by Atlassian.

In some cases, the GUI client application resides and executes on a computer used by the software developer, while the repository and/or SCM service resides and executes on server computers that can connected with the developer's computer by a network. When the software developer initiates an action through the GUI client, the GUI client software causes the action to be communicated to the SCM service or the repository over a network. Thus, terminology such as remote build may refer to a build process that is initiated by a GUI client executing on a software developer's computer, for execution by an SCM service or a build service on a repository that resides on one or more other computers with which the developer's computer can communicate over a network.

It has been cumbersome for GUI clients used by software developers working with cloud-based repositories to obtain important information related to the current status of the source code repository, such as the status of a commit, or a build status, or the status of the hosting service that hosts the repository. In fact, the desired status data usually is not directly accessible to the GUI client at all. Instead, the computer being operated by the developer using the GUI client has needed to perform a context switch or execute a special query to obtain the desired status information from another computer or service, such as a web service. Further, status service querying capabilities have been very rudimentary, often only able to return long lists of data that must be manually perused by the developer to pick out information of interest. In some cases, developer computers have had to repeatedly send 'refresh' commands to a status provider web page until the status data of interest is made available.

As described in the present disclosure, a computer-implemented mechanism can directly integrate status data relating to a source code repository into a client application, such as a graphical software development interface. For example, using the disclosed technologies, a client application executing on a computer used by a software developer can generate a visualization of status data associated with a source code repository that is hosted by another computer, when the status data relates to an action executed by the client application that involves the source code repository or an operational status of the executed action. In this way, the disclosed technologies can reduce or eliminate the need for the computing device executing the client application to perform repetitive context-switching and querying processes.

Environment Overview

FIG. 1 illustrates a computing environment in which embodiments of the features described in this document can be implemented.

In an embodiment, computing environment 100 includes computing devices 110 and computing devices 140, which are communicatively coupled to an electronic communications network 120. Implemented in computing devices 110, 140 using computer software, hardware, or software and hardware, are combinations of automated functionality, data structures, and digital data, which are represented schematically in FIG. 1 as hosting services 102, source code management (SCM) systems 104, shared source code repositories 106, status providing services 108 and software development interface 150.

Although computing environment 100 may be implemented with any number N (where N is a positive integer) of hosting services 102, source code management (SCM) systems 104, shared source code repositories 106, status providing services 108, computing devices 110, and computing devices 140, respectively, in this disclosure, these elements may be referred to in the singular form for ease of discussion. Also, hosting services 102, source code management (SCM) systems 104, shared source code repositories 106, and status providing services 108 are shown as separate elements in FIG. 1 for ease of discussion but the illustration is not meant to imply that separation of these elements is required. The illustrated systems (or their functionality) may be divided over any number of physical systems, including a single physical computer system, and can communicate with each other in any appropriate manner.

In environment 100, shared source code repository 106 comprises a source code repository that receives source code contributions from one or more different computing devices 140 and stores the source code contributions and associated metadata in a searchable, computer-implemented data structure.

Operation of shared source code repository 106, including version control, is managed by SCM system 104. The SCM system 104 may store and manage multiple different source code repositories, including the shared source code repository 106, in which case the SCM system 104 maintains metadata to keep track of different repositories, different source code files stored in each repository, and different versions of each source code file stored in each repository. The metadata maintained by the SCM system 104 may include build instructions, which include, for example, steps for performing a build and unique identifiers of one or more testing environments or virtual machine images.

The shared source code repository 106 is hosted by a hosting service 102. The hosting service 102 enables network access to shared source code repository 106 by other computing services on the network 120. The SCM system 104 may be hosted by hosting service 102 or by a different hosting service. One example of a system that provides a shared source code repository, SCM functionality, and hosting services is BITBUCKET by Atlassian.

The status providing service 108 provides (for example, in response to a query) or exposes (for example, via an application programming interface or API) or otherwise makes accessible to other software applications and/or computer services status information that relates to shared source code repository 106, such as changes in the status of portions of shared source code repository 106 over time. In some implementations, status providing service 108 monitors and provides the status of hosting service 102, including whether hosting service 102 is operational or not operational at certain time intervals. One example of a status providing service that facilitates access to status information about various hosting services is STATUSPAGE by Atlassian. In some implementations, communication between software development interface 150 and status providing service 108 occurs asynchronously.

Alternatively, or in addition, status providing service 108 monitors the status of computer operations received by, or which impact, shared source code repository 106, such as commit, build, and test operations. The computer operations monitored by status providing service 108 may include operations that were previously initiated by software development interface 150 or by SCM system 104, for example. One example of a status providing service that monitors operations against a shared source code repository is PIPELINES, a feature of BITBUCKET CLOUD by Atlassian.

The example software development interface 150 is communicatively coupled to computing device 140 and to the network 120. In some embodiments, the computing device 140 is a client computing device, such as a software developer's laptop machine, and computing device 110 is a server computer or network of server computers located on the Internet, in the cloud.

The software development interface 150 includes combinations of computer-implemented functionality, data structures, and digital data, which are represented schematically in FIG. 1 as a repository visualization subsystem 160 and a repository status monitor subsystem 170. The repository visualization subsystem 160 and the repository status monitoring system 170 may be implemented in a GUI client that interfaces with a shared source code repository 106 through an SCM system 104, for example to supplement the GUI client's existing functionality by connecting with one or more status providing services 108.

In operation, the computing device 140 operates the repository status monitor subsystem 170 to establish a logical connection over the network 120 with the status providing service 108 or the shared source code repository 106 or the SCM system 104 or the hosting service 102, to obtain status information relating to the shared source code repository. Status information may include, for example, digital data values, status values, or status signals that evidence the occurrence of an event impacting the performance or availability of shared source code repository 106. Examples of digital status data include but are not limited to data indicating an outage at the hosting service 102, and a failed test or build operation or a successful commit operation impacting the shared source code repository 106.

Logical connection as used in this disclosure may refer to a flow of digital information or data communication that is established between two devices on a network by network software communicating with, for example, the devices' operating systems either directly or by a virtual machine. Examples of protocols that may be used to establish the logical network connection include hypertext transfer protocol (HTTP) and secure sockets layer (SSL).

The computing device 140, by the repository status monitor subsystem 170, can establish and maintain logical network connections with other computing devices based on contextual triggers. For instance, a software developer interface 150 executing on the computing device 140 can initiate a logical connection with another computing device 110 when the other computing device 110 hosts a status providing service 108 that is a source of status information that relates to a shared source code repository 106 that is active in the software developer interface 150. For example, a determination by computing device 140 that the shared source code repository 106 is active in the software developer interface 150 can cause the repository status monitor subsystem 170 to establish a network connection with the status providing service for the currently active repository. Or, the example software development interface 150 would not establish a network connection with a status providing service 108 unless the status providing service 108 is a source of status information for a shared source code repository 106 that is currently active in the software development interface 150.

The repository visualization subsystem 160 of the software development interface 150 generates a visual representation of contextually relevant digital status data obtained by the repository status monitor subsystem 170 over the logical network connection with the status providing service 108, and displays the visual representation in a display device of the computing device 140. Contextually relevant as used in this document may refer to the fact that the digital status data being displayed in the software development interface 150 is associated with a shared source code repository 106 that is currently active in the software development interface 150—in other words, the repository visualization subsystem 160 automatically presents the digital status data when the digital status data is applicable to an activity that is occurring in the software development interface 150 and hides the digital status data when the digital status data is not applicable to a current activity.

Figure 3:
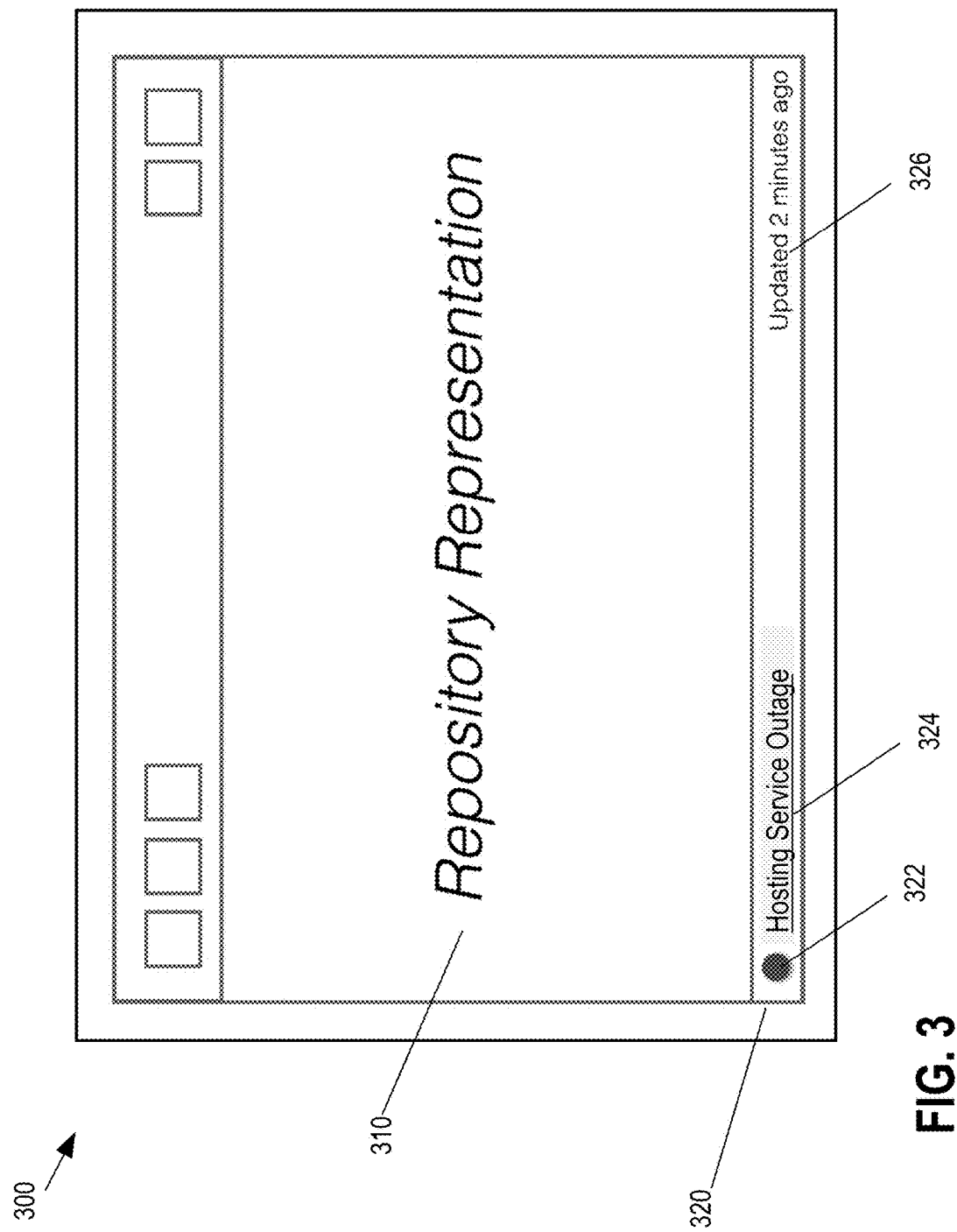
FIG. 3 is a simplified example of a graphical user interface that may be implemented by the computing system of FIG. 1.
Figure 4:
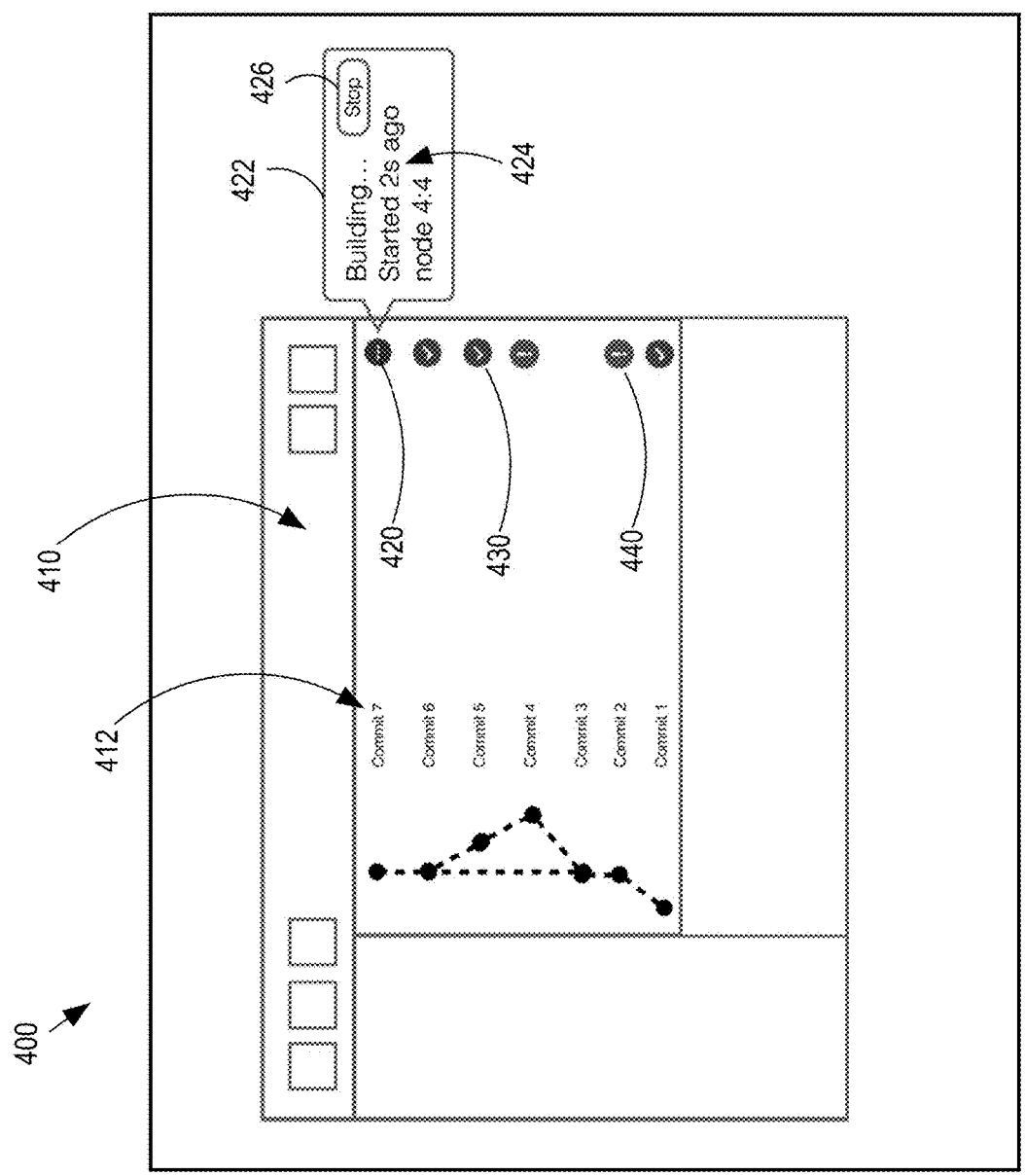
FIG. 4 is a simplified example of a graphical user interface that may be implemented by the computing system of FIG. 1.

Contextually relevant may alternatively or in addition refer to the positioning of the visual representation of digital status data on the display device in relation to visual displays of the activity that is currently occurring on the computing device 140. Examples of visual displays may include windows, graphical bars, and lines of text. Currently active or currently occurring as used in this disclosure may refer to the fact that the repository visualization subsystem 160 is designed to generate the display of the digital status data to avoid interrupting workflows that are in progress in the software development interface 150, such as workflows used by software developers. Examples of visual representations of the digital status data that may be generated by the repository visualization subsystem 160 are shown in FIGS. 3 and 4, described below.

Status Monitoring

Figure 2:
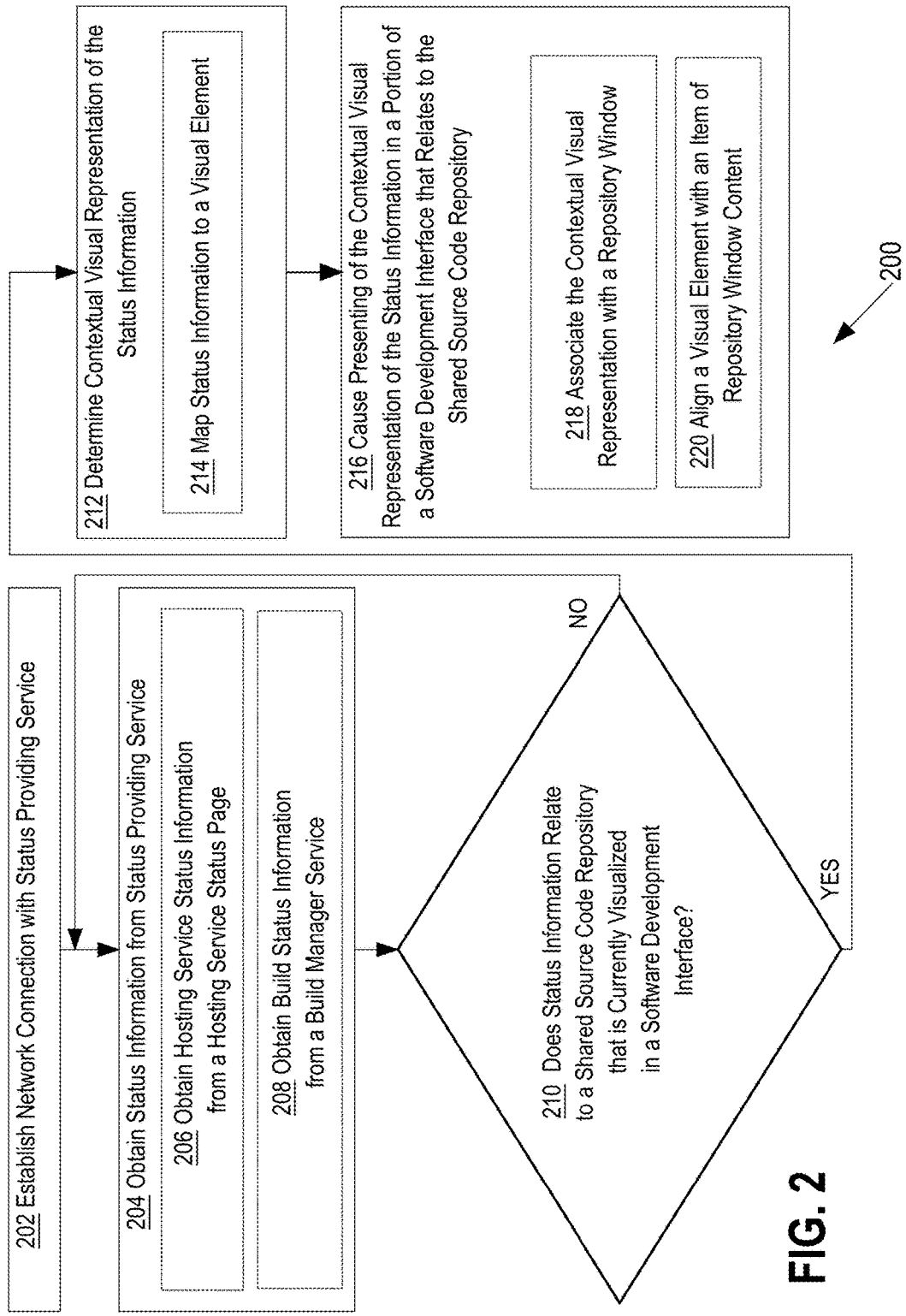
FIG. 2 is a simplified flow diagram of a process that may be executed by one or more components of the computing system of FIG. 1.

FIG. 2 is a simplified flow diagram of an embodiment of operations that can be performed by one or more components of a computing environment. For purposes of illustrating a clear example, FIG. 2 is described in the context of computing environment 100 and the software development interface 150, but other embodiments may use other environments or implemented techniques. The operations of a flow 200 as shown in FIG. 2 can be implemented using processor-executable instructions that are stored in computer memory. For purposes of providing a clear example, the operations of FIG. 2 are described as performed by computing device 140.

In operation 202, computing device 140 establishes a network connection with a status providing service 108, such as a third-party intermediary service or a continuous integration management service, to obtain digital status data relating to a shared source code repository. The intermediary service could be STATUSPAGE and the continuous integration management service could be PIPELINES, a feature of BITBUCKET CLOUD, in one embodiment. As discussed above, computing device 140 may condition initiation of the network connection with the status providing service on detection of activity in the software development interface 150 that involves a shared source code repository 106 for which the status providing service can provide digital status data. To detect such activity, the software development interface may be instrumented with a program trace or special code to implement a suitable monitoring or listening technique.

A mapping table, array, list, or other suitable data structure may be used to store data that indicates, to the software development interface 150, relationships between status providing service(s) and shared source code repositories. That is, for each shared source code repository that is accessible through the software development interface 150, an entry identifying a status providing service that can provide status data relevant to the shared source code repository, is stored in the mapping table. Such a mapping table can be generated by computing device 140 with human assistance, for example during a configuration of the software development interface. In operation, the software development interface 150 accesses the mapping table to determine whether to open network connections to any status providing services in accordance with the currently active source code repository or repositories.

In operation 204, computing device 140 obtains status information from the status providing service with which the computing device 140 established a network connection in operation 202. To obtain the status information, the computing device 140 may utilize an API exposed by the status providing service, for example. As discussed above, the status providing service can provide one or more different types of digital status data. If the status providing service is a source of status data for the hosting service that hosts the shared source code repository, computing device 140 obtains digital status data pertaining to the hosting service in operation 206. If the status providing service is a source of build status data, such as a build manager service, then computing device 140 obtains digital status data relating to a remote build action that had been initiated in an earlier time interval by the software development interface 150. The build manager service may be provided by a third party or may be integrated with, for example, the SCM system managing the shared source code repository.

In operation 210, computing device 140 determines whether the digital status data obtained in operation 204 is contextually relevant to activity that is currently occurring in the software development interface. To determine contextual relevance, computing device 140 determines whether the obtained digital status data relates to a shared source code repository that is currently active, for example visualized, in the software development interface, by, for example, reading log data generated by the software development interface that identifies by unique identifiers the shared source code repositories that currently have activity, such as open windows, in the software development interface.

Computing device 140 returns to operation 204 and continues to periodically obtain status information from status providing services, if the currently obtained status information does not relate to a currently active source code repository. If, however, computing device 140 determines that the currently obtained status information does relate to a currently active source code repository, computing device 140 continues to operation 212.

In operation 212, computing device 140 determines a contextual visual representation of the status information obtained in operation 204. Contextual visual representation may refer to the fact the visual representation of status data can change as the status data changes, and can be configured to reflect the specific repository or activity to which it relates, such as a specific build action. Different visualizations may be generated by repository visualization subsystem 160 to represent different types of status information. For example, different windows and sets of graphical indicators may be applied to each of service status information and build status information. Alternatively, the same set of status indicators or icons may be applied in different visualizations for service status and hosting status.

To determine or select a contextually appropriate visual representation for the status information, computing device 140 may access a mapping table, array, list or other suitable data structure that stores relationships between visual representations and different types of status information. Examples of visual representations include graphical user interface elements like colors, lines, boxes, and icons. For instance, in the mapping table, a red 'x' icon may be associated with a hosting system outage, while a green checkmark icon may be associated with a hosting system's successful operation. Similarly, a red 'x' icon may indicate a failed remote build and a green checkmark may indicate a successful remote build. Such a mapping table can be generated by the computing device 140 with human assistance, for example during a configuration of the software development interface. In operation, the software development interface 150 accesses the mapping table to determine which visual elements to use as indicators of digital status data.

In operation 216, computing device 140 causes the contextual visual representation of the status information, which has been determined in operation 212, to be presented in a portion of the software development interface that relates to the corresponding shared source code repository. The presentation may comprise, for example, displaying in a display device. To cause the presentation, in some implementations, computing device 140 in operation 218 associates the contextual visual representation with a repository window, for example by displaying a status message at the bottom of the repository window. An example of this type of contextual display is shown in FIG. 3, described below.

Alternatively, or in addition to operation 218, in some implementations, in operation 220, computing device 140 aligns the visual element determined in operation 212 with an item of content that is already displayed in a repository window, for example by displaying a status icon adjacent to a commit description in a listing of commit descriptions and/or other repository-related activity. An example of this type of contextual display is shown in FIG. 4, described below.

Computing device 140 may repeat process 200 for each repository window that is open in the software development interface. For instance, if two windows are open, with each window displaying activity for a different source code repository, computing device 140 may establish different network connections with different status providing services for each of the active windows. Further, computing device 140 may configure mapping tables and other aspects of process 200 such that the visual elements used to represent digital status data are customized for each specific source code repository.

Contextual Presentation of Status Information

FIG. 3 is a simplified illustration of a graphical user interface (GUI). In one embodiment, a GUI 300 may be displayed by computing device 140 implementing software development interface 150. The GUI 300 includes a repository window 310 of software development interface 150. In repository window 310, GUI 300 displays information (such as a source code listing) for a currently active source code repository. If a software developer using computing device 140 were working with multiple different repositories at the same time, GUI 300 would include a separate window such as window 310 for each active repository.

In the illustration of FIG. 3, repository status monitor subsystem 170 has received digital status data from a status providing service, such as a third-party intermediary service like STATUSPAGE, indicating that the hosting service that hosts the repository displayed in the window 310 has had an outage. In response to receipt of digital status data from the status providing service indicating a hosting service outage relating to the currently active repository for which information is displayed in window 310, repository visualization subsystem 160 has displayed the status information in visual element 320. Visual element 320 includes a combination of text 324, 326 and graphics 322. Graphical element 322 is an icon that is configured to indicate a characteristic of the displayed status information. For example, graphical element 322 may be color-coded according to the severity of the notification (such as red to indicate a complete hosting service outage, yellow to indicate a temporary outage, or green to indicate normal operation of the hosting service). Alternatively, or in addition, graphical element 322 may include alphanumeric characters, symbols or other graphical designs as status indicators (such as an exclamation point to indicate an outage or a check mark to indicate normal operation in progress).

Text element 324 includes a hyperlink, which can be selected by user input (such as a mouse click or tap on a touchscreen of a display device) in order to reveal additional details about the outage, such as a verbose description and/or a most recent timestamp obtained from the status providing service. Use of a third-party status providing service rather than communicating directly with the primary hosting service ensures that status data will be available even when the primary hosting service is down. Text 326 displays a time stamp, which is updated by the software development interface 150 when updates to the status information (322, 324) have been made.

FIG. 4 is a simplified illustration of another graphical user interface (GUI). In an embodiment, GUI 400 may be displayed by computing device 140 implementing software development interface 150. The GUI 400 includes a repository window 410 of software development interface 150. In the repository window 410, GUI 400 displays information (such as a listing of commit activity) for a currently active source code repository. If a software developer using computing device 140 were working with multiple different repositories at the same time, GUI 400 would include a separate window (such as window 410) for each active repository.

In the illustration of FIG. 4, repository status monitor subsystem 170 has received digital status data from a status providing service indicating the status of various operations 420 that have been initiated against the repository (such as a listing of commits). In response to receipt of digital status data relating to particular ones of the displayed operations (such as particular commits), repository visualization subsystem 160 has revealed status information as visual elements 420, 430, 440. Visual elements 420, 430, 440 include graphical icons that are aligned by repository visualization subsystem 160 with related items of content, such as textual descriptions of the particular commit actions 412 to which they relate. The graphical icons 420, 430, 440 can be color-coded to indicate the status of the respective action (such as red for failed, green for completed, blue for in-progress).

Alternatively or in addition, graphical icons 420, 430, 440 may include alphanumeric characters, symbols or other graphical designs as status indicators (such as an exclamation point to indicate that an error has occurred, or a check mark to indicate successful completion). As shown illustratively for visual element 420, each of visual elements 420, 430, 440 may be interactively expanded (for example by the computing device 140 detecting a tap, mouse click or movement of a cursor over or on an interactive button) to a pop-up notification 422, which reveals additional details 424 about the status. The additional details 424 may include a verbose description of the status and/or a most recent timestamp obtained from the status providing service.

In the illustration, the expanded status pop-up 422 also includes a control element 426. Control element 426 can be activated by an input device (for example by the computing device 140 detecting a mouse click or sensing a user tap on a touchscreen) to cause the computing device 140 to issue a control command to the hosting service 102 or the SCM system 104 or the shared source code repository 106 directly through the software development interface 150. Activation of control element 426 causes an operation (such as a "stop" operation) to occur with respect to the repository-related action with which the control element 426 is associated ("Commit 7" in the example of FIG. 4). In this way, the contextual notification 422 can locally provide both a display of in-application status information and the ability to initiate actions with respect to the repository.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, mobile computing devices, wearable devices, networking devices or any other device that incorporates hard-wired and/or program logic to implement the techniques.

Figure 5:
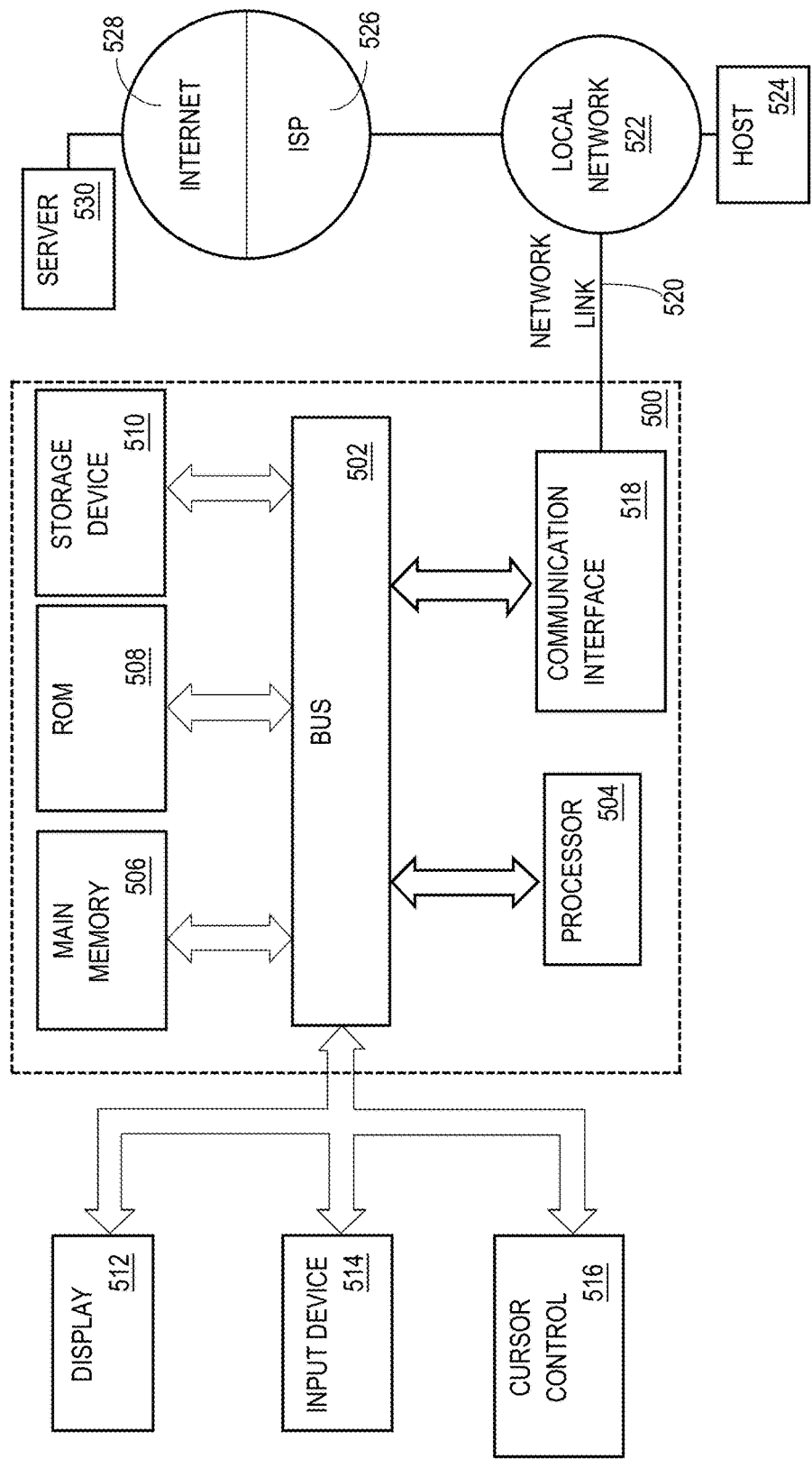
FIG. 5 is a simplified block diagram illustrating an embodiment of a hardware environment, which may be used to implement various aspects of the computing system of FIG. 1.

For example, FIG. 5 is a block diagram that illustrates a computer system 500 upon which an embodiment of the present invention may be implemented. Computer system 500 includes a bus 502 or other communication mechanism for communicating information, and a hardware processor 504 coupled with bus 502 for processing information. Hardware processor 504 may be, for example, a general-purpose microprocessor.

Computer system 500 also includes a main memory 506, such as a random-access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated-services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features mentioned or evident from the text or drawings. These different combinations constitute various alternative aspects of the embodiments.

What is claimed is:

1. A computer-implemented method for communicating, to a software development interface displayed in a computer display device and usable by a software developer to interact with one or more shared source code repositories, digital status data relating to remote computer operations that impact the one or more shared source code repositories and are monitored by a status providing service that makes the digital status data accessible to one or more other software applications, the method comprising:
   when an activity in the software development interface involves a shared source code repository that maps to the status providing service, establishing a logical network connection, which includes a flow of digital information on a network, between a first computing device that is executing the software development interface and a second computing device that is executing the status providing service, wherein the software development interface is communicatively coupled to the shared source code repository;
   obtaining status data for an event impacting the shared source code repository, by receiving messages from the status providing service over the logical network connection by one or more of an application programming interface and asynchronously querying the status providing service;
   causing digitally displaying a visual representation of the status data in a portion of the software development interface that displays a view of the shared source code repository;
   determining a visual element to display as at least a portion of the visual representation of the status data based on a mapping of the visual element to an attribute of the status data;
   causing aligning display of the visual element with a related item of content representative of a portion of the shared source code repository displayed in the software development interface, wherein the visual element comprises a graphical icon indicative of an impact of an operational status of a hosting service or an operational status of a remote build service on a particular activity occurring in the software development interface.

2. The method of claim 1, wherein the status providing service comprises a third-party service and obtaining status data comprises, by the status providing service, obtaining a status signal from a hosting service that hosts or executes the shared source code repository.

3. The method of claim 1, wherein the status providing service is communicatively coupled to the shared source code repository and obtaining status data comprises, by the status providing service, obtaining a status signal of a build action initiated using the software development interface.

4. The method of claim 1, comprising transmitting, to a build service executing on the first computing device to cause building of an executable of computer program source code obtained from the shared source code repository, a request to report a status value representing an operational status of the build service, and receiving the status data as the status value from the build service in response to the request.

5. The method of claim 1, further comprising, using an application programming interface, asynchronously querying the status providing service to obtain the status data.

6. The method of claim 1, further comprising, in response to a change in the status data, causing updating of the visual representation of the status data in the portion of the software development interface that relates to the shared source code repository.

7. The method of claim 1, wherein at least two of the software development interface, the status providing service, and the shared source code repository are operated using at least two different computing services.

8. A system for communicating, to a software development interface displayed in a computer display device and usable by a software developer to interact with one or more shared source code repositories, digital status data relating to remote computer operations that impact the one or more shared source code repositories and are monitored by a status providing service that makes the digital status data accessible to one or more other software applications, the system comprising:
   one or more processors;
   a communication interface coupled to the one or more processors;
   one or more non-transitory computer-readable storage media coupled to the one or more processors and storing sequences of instructions, which when executed by the one or more processors, cause the one or more processors to:
   when an activity in the software development interface involves a shared source code repository that maps to the status providing service, establish a logical network connection, which is a flow of digital information on a network, between a first computing device that is executing the software development interface and a second computing device that is executing the status providing service, wherein the software development interface is communicatively coupled to the shared source code repository;
   obtain status data for an event impacting the shared source code repository, by receiving messages from the status providing service over the logical network connection by one or more of an application programming interface and asynchronously querying the status providing service;
   cause digitally displaying a visual representation of the status data in a portion of the software development interface that displays a view of the shared source code repository;

determine a visual element to display as at least a portion of the visual representation of the status data based on a mapping of the visual element to an attribute of the status data;

cause aligning display of the visual element with a related item of content representative of a portion of the shared source code repository displayed in the software development interface, wherein the visual element comprises a graphical icon indicative of an impact of an operational status of a hosting service or an operational status of a remote build service on a particular activity occurring in the software development interface.

9. The system of claim 8, wherein the status providing service comprises a third-party service and the one or more processors are configured to execute instructions that cause the one or more processors to: by the status providing service, obtain a status signal from a hosting service that hosts or executes the shared source code repository.

10. The system of claim 8, wherein the status providing service is communicatively coupled to the shared source code repository and the one or more processors are configured to execute instructions that cause the one or more processors to: by the status providing service, obtain a status signal of a build action initiated using the software development interface.

11. The system of claim 8, wherein the one or more processors are configured to execute instructions that cause the one or more processors to: transmit, to a build service executing on the first computing device to cause building of an executable of computer program source code obtained from the shared source code repository, a request to report a status value representing an operational status of the build service, and receive the status data as the status value from the build service in response to the request.

12. The system of claim 8, wherein the one or more processors are configured to execute instructions that cause the one or more processors to: asynchronously query the status providing service to obtain the status data.

13. The system of claim 8, wherein the one or more processors are configured to execute instructions that cause the one or more processors to: in response to a change in the status data, cause updating of the visual representation of the status data in the portion of the software development interface that relates to the shared source code repository.

14. The system of claim 8, wherein at least two of the software development interface, the status providing service, and the shared source code repository are operated using at least two different computing services.

15. One or more non-transitory computer readable storage media storing instructions which, when executed by a processor, cause the processor to communicate, to a software development interface displayed in a computer display device and usable by a software developer to interact with one or more shared source code repositories, digital status data relating to remote computer operations that impact the one or more shared source code repositories and are monitored by a status providing service that makes the digital status data accessible to other software applications as a service, by:

when an activity in the software development interface involves a shared source code repository that maps to the status providing service, establishing a logical network connection, which is a flow of digital information on a network, between a first computing device that is executing the software development interface and a second computing device that is the status providing service, wherein the software development interface is communicatively coupled to the shared source code repository;

obtaining status data for an event impacting the shared source code repository, by receiving messages from the status providing service over the logical network connection by one or more of an application programming interface and asynchronously querying the status providing service;

causing digitally displaying a visual representation of the status data in a portion of the software development interface that displays a view of the shared source code repository;

determining a visual element to display as at least a portion of the visual representation of the status data based on a mapping of the visual element to an attribute of the status data;

causing aligning display of the visual element with a related item of content representative of a portion of the shared source code repository displayed in the software development interface, wherein the visual element comprises a graphical icon indicative of an impact of an operational status of a hosting service or an operational status of a remote build service on a particular activity occurring in the software development interface.

16. The one or more non-transitory computer readable storage media of claim 15, storing instructions which, when executed by a processor, cause the processor to: by the status providing service, obtain a status signal from a hosting service that hosts or executes the shared source code repository, wherein the status providing service comprises a third-party service.

17. The one or more non-transitory computer readable storage media of claim 15, storing instructions which, when executed by a processor, cause the processor to: by the status providing service, obtain a status signal of a build action that was initiated using the software development interface, wherein the status providing service is communicatively coupled to the shared source code repository.

18. The one or more non-transitory computer readable storage media of claim 15, storing instructions which, when executed by a processor, cause the processor to: transmit, to a build service executing on the first computing device to cause building of an executable of computer program source code obtained from the shared source code repository, a request to report a status value representing an operational status of the build service, and receive the status data as the status value from the build service in response to the request.

19. The one or more non-transitory computer readable storage media of claim 15, storing instructions which, when executed by a processor, cause the processor to: asynchronously query the status providing service to obtain the status data.

20. The one or more non-transitory computer readable storage media of claim 15, storing instructions which, when executed by a processor, cause the processor to: in response to a change in the status data, cause updating of the visual representation of the status data in the portion of the software development interface that relates to the shared source code repository.

21. The one or more non-transitory computer readable storage media of claim 15, wherein at least two of the software development interface, the status providing service, and the shared source code repository are operated using at least two different computing services.

* * * * *